United States Patent
Phelps et al.

(10) Patent No.: US 7,974,814 B2
(45) Date of Patent: Jul. 5, 2011

(54) MULTIPLE SENSOR FUSION ENGINE

(75) Inventors: Ethan Phelps, Waltham, MA (US);
Herbert Landau, Bedford, MA (US)

(73) Assignee: Raytheon Company, Waltham, MA (US)

( * ) Notice: Subject to any disclaimer, the term of this patent is extended or adjusted under 35 U.S.C. 154(b) by 1017 days.

(21) Appl. No.: 11/818,651

(22) Filed: Jun. 15, 2007

(65) Prior Publication Data
US 2010/0070238 A1   Mar. 18, 2010

(51) Int. Cl.
*G06F 19/00* (2006.01)

(52) U.S. Cl. ........................................ 702/181

(58) Field of Classification Search ................ 702/117, 702/118, 181–185, 188
See application file for complete search history.

(56) References Cited

U.S. PATENT DOCUMENTS

| | | | |
|---|---|---|---|
| 5,963,653 | A | 10/1999 | McNary et al. |
| 5,999,893 | A | 12/1999 | Lynch, Jr. et al. |
| 7,065,465 | B2 | 6/2006 | Chen et al. |
| 7,151,466 | B2 | 12/2006 | Gabelmann et al. |
| 2007/0076917 | A1 | 4/2007 | Chen et al. |
| 2008/0071800 | A1* | 3/2008 | Neogi et al. ............ 707/100 |

OTHER PUBLICATIONS

Written Opinion of the International Searching Authority for PCT Application No. PCT/US2008/006070 mailed Jan. 23, 2009 (four (4) pages).
Akaike, Hirotugu, "Use of Statistical Models for Time Series Analysis" IEEE Preceedings of ICASP, 1986; pp. 3147-3155.
Akaike, Hirotugu, "A New Look at the Statistical Model Identification" IEEE Transactions on Automatic Control, Dec. 1974; pp. 716-723.
Burnham, Kenneth and David Anderson, "Multimodel Inference: Understanding AIC and BIC in Model Selection," Colorado Cooperative Fish and Wildlife Research Unit (USGS-BRD), May 1994; (56 pages total).
Jaynes, Edwin, "The Well-Posed Problem" Foundations of Physics, 3, 1973; pp. 477-493 (11 pages total), Jun. 1, 1973.
Mika, Ratsch, Weston, Scholkopf, and Miller, "Fisher Discriminant Analysis with Kernals," IEEE, 1999; pp. 41-48.
Shore, John and Johnson, Rodney W., "Properties of Cross-Entropy Minimization" IEEE Transactions on Information Theory, vol. IT-27, No. 4, Jul. 1981; pp. 472-482.
Principe, Xu, Zhao and Fisher, "Learning from Examples with Information Theoretic Criteria," Computational NeuroEngineering Laboratory, University of Florida, Gainsville, FL; (20 pages), Aug. 20, 2000.

* cited by examiner

*Primary Examiner* — Edward Raymond
(74) *Attorney, Agent, or Firm* — Iandiorio Teska & Coleman

(57) ABSTRACT

A method and system for of fusing the outputs of multiple sensors. The output of each sensor including a sensor class probability vector based on each sensor's classification database is input to a fusion engine which estimates a base class probability vector based on the sensor class probabilities output by the sensors and a preconfigured base database including base classes.

16 Claims, 8 Drawing Sheets

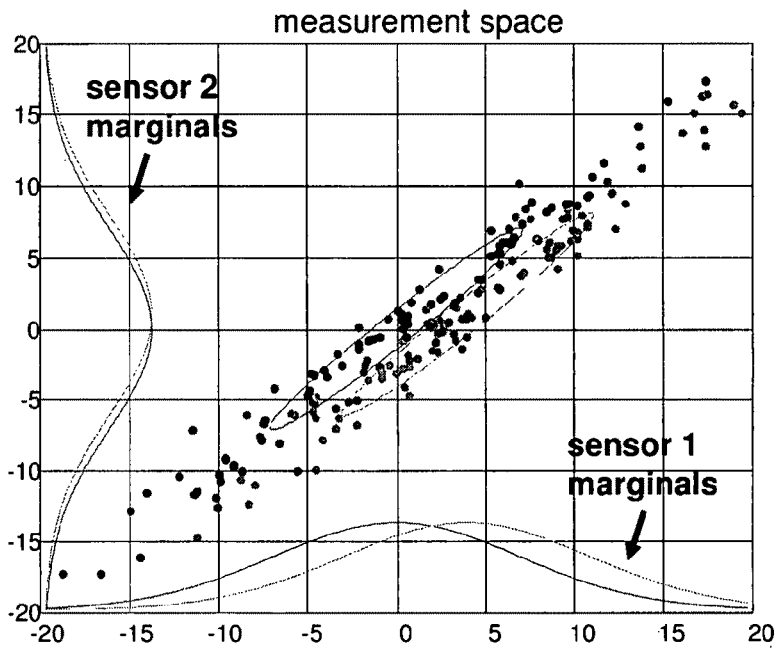
FIG. 6
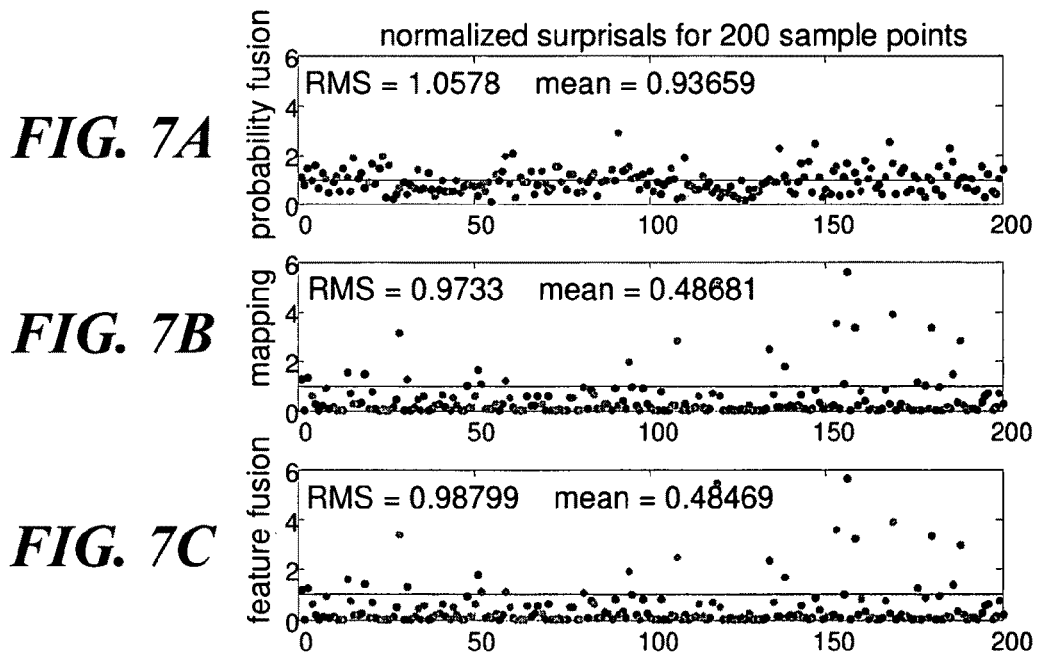
FIG. 7A
FIG. 7B
FIG. 7C

MULTIPLE SENSOR FUSION ENGINE

FIELD OF THE INVENTION

This subject invention relates to sensors including but not limited to radar systems used in missile defense applications.

BACKGROUND OF THE INVENTION

Two or more sensors are often used to detect different or even the same parameters. In one non-limiting example, a Forward Based X-Rand Radar subsystem may be used in a missile defense application to detect, track, and discriminate threats. Other radar subsystems such as a Sea-Based X-Band Radar may also be used in the missile defense application.

When a threat is launched, the missile and its warheads and decoys are tracked. A battle management center then receives the output from the various radar subsystems and deploys, sometimes automatically, an interceptor to destroy any threats. The radar subsystems output kinematic data (e.g., the number of detected objects, their location, speed, and trajectory) as well as classification data with assigned probabilities.

The classification data may discriminate, as between numerous detected objects, whether they are lethal or not, friend or foe, and their type (e.g., re-entry vehicle, decoy, and the like), among other classification criteria.

Each radar subsystem includes a unique database and software which outputs class probability vectors which are a function of the measurements obtained from the radar itself and the database of that radar subsystem. As between a Forward Based X-Band Radar subsystem and a Sea-Based X-Band Radar subsystem, for example, the respective measurements may be different for a given target. The respective radar databases may also be configured differently. And, the software based analysis carried out by each subsystem to analyze their measurements as a function of their respective databases may be different. This is especially true for radar subsystems supplied by different vendors and/or at different times or as between different versions in a product development effort.

So, one radar subsystem may provide, to the battle management center, a sensor class probability vector $P_1$ as a function of its measurements $Y_1$ and its database $D_1$ and a different radar subsystem may provide a different sensor class probability vector $P_2$ as a function of its measurements $Y_2$ and its database $D_2$.

It would be advantageous, then, to configure the different radar subsystems to transmit their actual measurements to the battle management center and classify potential threats based on all the incoming measurements. Currently, because of the configuration of the various radar subsystems, this is not possible. Also, the data communications interfaces would have to change.

Multiplying and normalizing the probability vectors from each radar subsystem does not work because correlations are ignored. Other possible solutions either fail to yield accurate results or are difficult to implement.

SUMMARY OF THE INVENTION

It is therefore an object of this invention to provide a new method of and system for resolving and fusing the output of multiple sensors.

It is a further object of this invention to provide such a method and system which can be used not only in a missile defense application but also in other applications.

It is a further object of this invention to provide such a method and system which, when employed in a missile defense application, provides better protection.

It is a further object of this invention to provide such a method and system which, in any environment, is more accurate and more reliable.

It is a further object of this invention to provide such a method and system which is fairly simple, fast, and which operates in real time.

It is a further object of this invention to provide such a method and system which improves the discrimination of multi-sensor data.

It is a further object of this invention to provide such a method and system which does not require a change to the communication interfaces.

It is a further object of this invention to provide such a method and system which requires less memory and computational effort.

The subject invention results from the realization that by fusing the outputs of multiple sensors using a preconfigured base database and a mapping approach wherein an ideal classifier function is approximated, the method and system of this invention heuristically chooses a way to parameterize the classifier function which is then optimized according to a cost function. But, the typically computation intensive optimization is performed off-line and, as such, mapping can occur in real time. The result is a feasible, real time system and method using a minimal amount of computational effort and which yields good results.

The subject invention, however, in other embodiments, need not achieve all these objectives and the claims hereof should not be limited to structures or methods capable of achieving these objectives.

The subject invention features a method of fusing the outputs of multiple sensors. The preferred method includes inputting to a fusion engine the output of each sensor including a sensor class probability vector based on each sensor's classification database and estimating a base class probability vector based on the sensor class probabilities output by the sensors and a preconfigured mapping function.

In one example, the sensor class probability vector is converted to log-space. The typical mapping function includes anchor points and estimating may include finding the differences between the log-space probability vectors and the anchor points. The typical mapping function also includes mapping matrices and estimating may include mapping each difference using the mapping matrices. The mapping function may further include reference points and estimating may then include adding reference points to the mapped differences.

Estimating typically includes weighting and summing the mapped differences, converting the weighted and summed mapped differences back to probability space to produce the probability vector, and normalizing the probability vector.

The subject invention also features a system for fusing the output of multiple sensors. The preferred system comprises multiple sensors each including a classification database and each outputting a sensor class probability vector based on its classification database. A fusion engine is responsive to the output of each sensor. A base database includes base classes and the fusion engine is configured to estimate a base class probability vector based on the sensor outputs and the base database classes.

The typical fusion engine is configured to convert the sensor class probability vectors to log-space. A preferred mapping function includes anchor points and the fusion engine is configured to find the differences between the log-space probability vectors and the anchor points. The mapping function may include mapping matrices and the fusion engine is then configured to map each difference using the mapping matrices. If the mapping function includes reference points, the fusion engine can be configured to add reference points to the mapped differences.

The preferred fusion engine is configured to weigh and sum the mapped differences, to convert the weighted and summed mapped differences back to probability space to produce the probability vector, and to normalize the probability vector.

BRIEF DESCRIPTION OF THE SEVERAL VIEWS OF THE DRAWINGS

Other objects, features and advantages will occur to those skilled in the art from the following description of a preferred embodiment and the accompanying drawings, in which:

FIG. 6 is a graph showing the base and sensor class distributions for an example when the method of the subject invention was implemented;

FIGS. 7A-7C are plots showing the normalized surprisals for 200 sample points for an example of the implementation of the subject invention showing, respectively, probability fusion, mapping, and feature fusion;

DETAILED DESCRIPTION OF THE INVENTION

Figure 1:
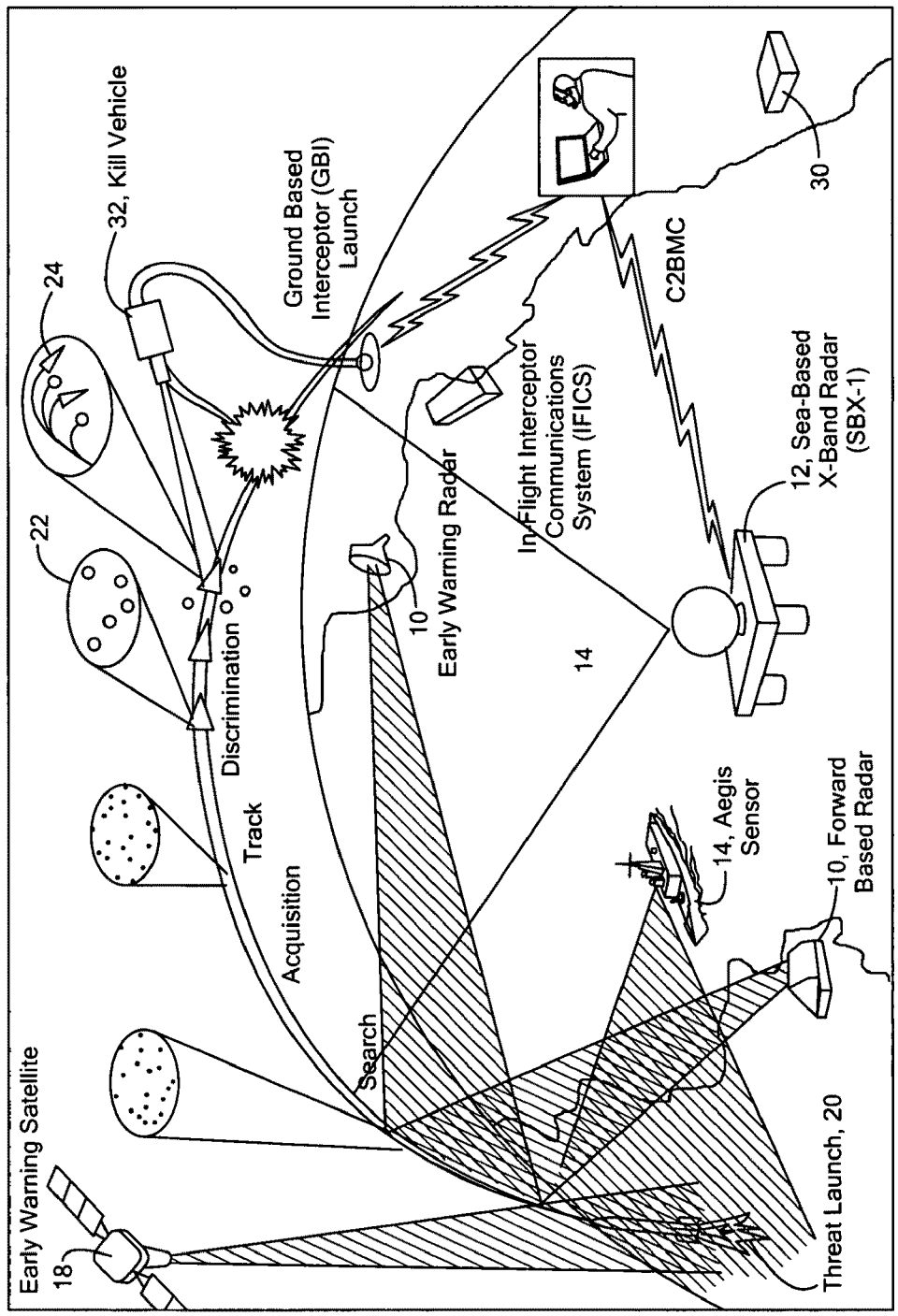
FIG. 1 is a highly schematic view showing an example of an application of a method of fusing the outputs of multiple sensors in accordance with the subject invention.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

FIG. 1 shows multiple sensor subsystems in a ballistic missile defense application in accordance with an example of the subject invention. The multiple sensors include Forward Based X-Band Radar subsystem 10, Sea-Based X-Band Radar subsystem 12, Aegis sensor 14, early warning radar 16, early warning satellite 18, and the like all of which assist in tracking and classifying threat 20 and re-entry vehicles 22 and decoys 24 deployed by missile 20.

The probability vectors (sensor class probabilities) output by each sensor subsystem are transmitted to battle management center 30 which deploys, sometimes automatically, kill vehicle 32 to intercept any targets likely to be threats.

Figure 2:
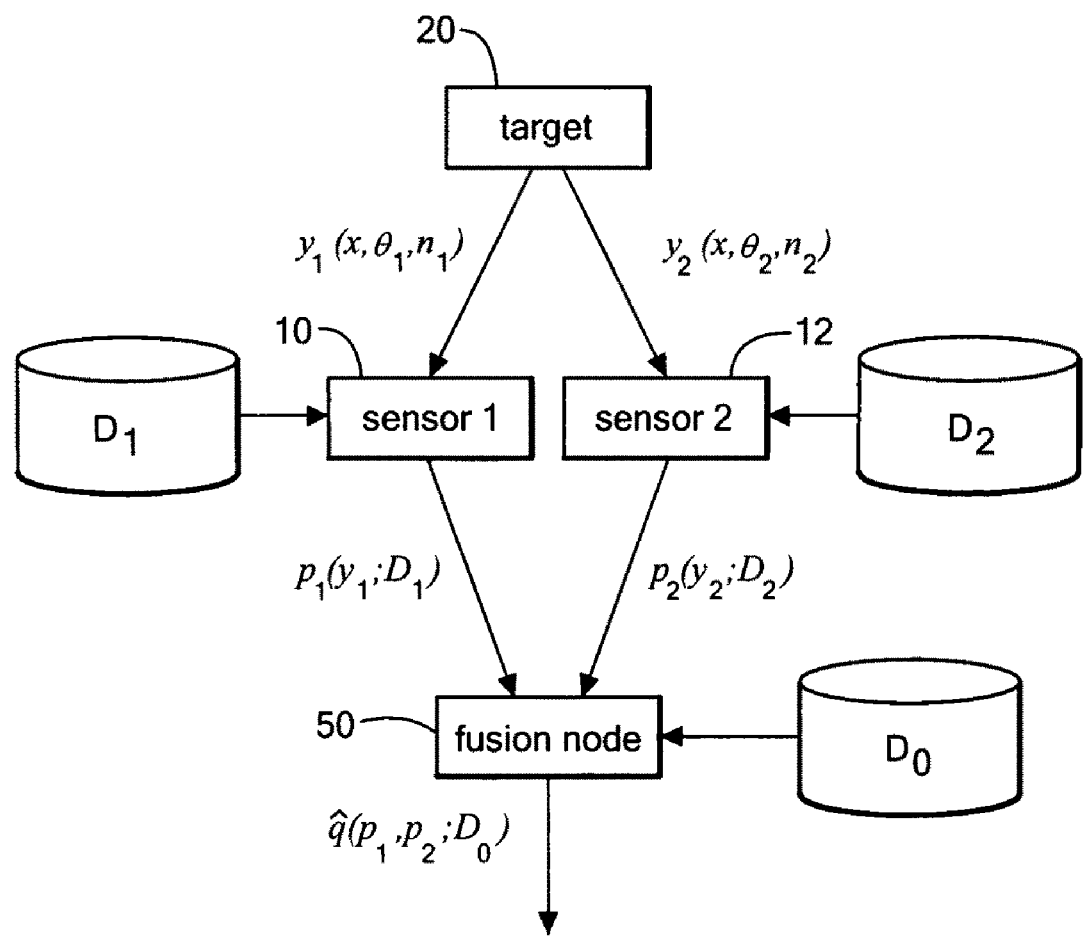
FIG. 2 is a block diagram showing an example of a fusion node in accordance with the subject invention.

As explained in the Background section above, the different sensors may output different sensor class probabilities to battle management center 30. For example, sensor 10, FIG. 2 (e.g., a Forward Based X-Band Radar subsystem) may output, as shown, sensor class probability vector $P_1$ which is a function of its measurements ($Y_1$) and its database ($D_1$). Sensor 12 (e.g., a Sea-Based X-Band Radar subsystem) may output, as shown, a different sensor class probability vector $P_2$ which is a function of its measurements ($Y_2$) and its database ($D_2$). Each sensor's measurements Y, in turn, are typically a function of the features detected, the sensor parameters, and sensor noise.

The respective measurements may differ for a given target. The respective databases $D_1$ and $D_2$ may also be configured differently. And, the software based analysis of each subsystem's measurements as a function of their respective databases may be different.

In the subject invention, fusion node 50 (which may be implemented in a computer located at battle management center 30, FIG. 1) includes software which receives as an input the classification results ($P_1$, $P_2$) output by each sensor based on each sensor's database ($D_1$, $D_2$). Software within fusion node 50 is configured to estimate a classification result $\hat{q}$ as a function of $P_1$, $P_2$, and $D_0$, a preconfigured base database populated with base classes as described below.

As explained in the Background Section above, multiple sensor discrimination/fusion is hindered by the current scheme of passing only class probabilities. By passing probabilities rather than features, information is lost. Database mismatch and correlations between features should be accounted for when fusing. The problems with passing only probabilities include the fact that sensors 10 and 12 may have different databases, $D_1$ and $D_2$. Comparing probability vectors from the two would be like comparing apples and oranges. Also, the sensors might measure different sets of features that are correlated. Performance can degrade severely if only one sensor's probabilities are used, or if the two probability vectors are fused as if they are independent. One solution according to this invention recovers much of the performance that would be lost if a simple probability fusion were performed.

One or more sensors 10, 12 take measurements of a target's attributes. The sensors can measure different sets of attributes, have different noise variances, and have different measurement parameters (e.g., aspect angle). Rather than passing the measurements to fusion node 50, they each run their own classifier, and pass the resulting probability vector p. The sensors have their own databases $D_1$ and $D_2$, which may be different from each other. Fusion node 50 is configured to estimate the probabilities of classes in its own database $D_0$ which is not necessarily common to any of the sensor databases. The classes of database $D_0$ are herein called base classes.

Bayes' law optimally classifies from a set (vector) of features as follows:

$$q_i(y) \equiv Pr(c_i | y) = \frac{f(y|c_i)Pr(c_i)}{\sum_i f(y|c_i)Pr(c_i)} \quad (1)$$

The equation has the same form for a set of class probabilities:

$$q_i(p) \equiv Pr(c_i | p) = \frac{f(p|c_i)Pr(c_i)}{\sum_i f(p|c_i)Pr(c_i)} \quad (2)$$

The difficulty is that there is no simple explicit form for the likelihoods. Even if the conditional distributions for the features are explicitly defined, the likelihoods won't be.

Three approaches are possible, but two have difficulties in implementation. All three of these approaches make no assumptions about the types of distributions in the databases. The distributions can have any form: Gaussian, Gaussian-sum, uniform, piecewise-linear, and the like. The classifiers can be treated as black boxes. It can help to think of them as arbitrary functions as opposed to classifiers that return probability vectors. Taking this view makes it apparent that the multi sensor fusion problem can be treated in the same way as the single sensor database-mismatch problem. The p vectors are stacked and then processed as usual, because they are nothing but data on which we want to condition our estimates of class probabilities.

One solution is to build a set of conditional histograms offline, one for each class. But, this approach has problems with feasibility. First, a class is chosen and a large number of points in feature space are drawn from that class. Then, the sensor's classifier is run on each point, which yields a p vector. A grid is formed probability space, and how many p vectors fall in each bin are counted. The resulting histogram is an estimate of the probability density function of p, given class i. After the histograms are built offline, they can be used to implement Bayes' law directly by looking up likelihoods in real time. One problem with this method is that it suffers a huge curse of dimensionality for resolution in probability space. For instance, in a problem with one sensor, five sensor classes, and a desired probability resolution of 1%, the number of bins is $100^5 = 10^{10}$. To draw enough points to fill those bins without too much quantization might yield $10^{12}$ points for each base class.

Another possible solution, inversion, involves inverting the p vector to find a conditional probability density function for the measurements/features. This method is not practical to implement. Given a p vector, if the sensor classifier function were inverted, the result would be one or more regions of measurement space. A classifier is generally a many to one function:

$$p = g(y) Y = \{y : g(y) = p\} \quad (3)$$

$$f(y|p) = f(y|y \in Y) \quad (4)$$

Once the possible regions of measurement space are obtained, the ideal feature classifier can be integrated over it, to obtain the conditional class probabilities:

$$q(p) \equiv Pr(c | p) \quad (5)$$

$$= \int Pr(c|y) f(y|p) dy$$

$$= \int q(y) f(y | y \in Y) dy$$

$$= \frac{\int_{y \in Y} q(y) f(y) dy}{\int_{y \in Y} f(y) dy}.$$

This method would be difficult to implement, and would require a large amount of computation in real time.

The preferred approach, called mapping, turns out to be feasible and yields good results. Under certain conditions it can achieve optimal results. In mapping, an approximation is made of the ideal classifier function q(p). The method involves heuristically choosing a way to parameterize this function, and then optimizing it according to a cost function. The computation intensive optimization is preferably performed offline, and the real time application of the mapping uses a small amount of computation. Additionally, this method doesn't suffer the curse of dimensionality as badly as the histogram method because it exploits smoothness of distributions in measurement space. This is loosely analogous to approximating a time series by a truncated Fourier series. Herein the mapping approach is described in more detail.

One preferred cost function for optimizing an estimator of conditional probabilities is the expected value, taken over the data, of the cross-entropy between the optimal estimator and the existing estimator. Of course, the optimal estimator (q(p)) is not known. The cost has the important property that it is minimized by the optimal estimator. The cost function is defined in a form that is convenient for implementation, and can be expressed using the information theoretic terms mentioned above:

The table below defines the nomenclature of the equations also below:

| | |
|---|---|
| c | The true class. Class definitions are consistent with the base database. When c appears as a subscript of a vector, it denotes taking the $c^{th}$ element of that vector. |
| p | The probability vector from a sensor. These classes are the sensor classes. For the case where there is more than one sensor, p is a larger, stacked vector of the sensors' probability vectors. |
| q(p) | The true conditional probability vector of the base classes. That is: $q_i(p) = Pr(c = i|p)$. This is the optimal estimator, which in general, is unrealizable. |
| q̂(p) | The estimated conditional probability vector of the base classes. This function is what we need to define. |

| | |
|---|---|
| $\Psi(\hat{q}(\cdot))$ | The cost of the selected $\hat{q}(\cdot)$ function. The argument is omitted because the cost is averaged over all p, and therefore the cost is not a function of p. |
| $f(\cdot)$ | A continuous probability density function. (A discrete pdf can be expressed as a continuous pdf by using delta functions.) |
| $E_{f(\cdot)}[\cdot]$ | The expected value of $[\cdot]$ over $f(\cdot)$. |
| $H_x(q(p), \hat{q}(p))$ | The cross entropy of $\hat{q}(p)$ with respect to the true probability vector $q(p)$. |
| $H(q(p))$ | The entropy of $q(p)$. |
| $D_{KL}(q(p)\|\hat{q}(p))$ | The Kullback-Leibler divergence of $\hat{q}(p)$ with respect to $q(p)$. |

$$\Psi(\hat{q}(\cdot)) \equiv E_{f(c,p)}[-\log(\hat{q}_c(p))] \qquad (6)$$

$$= \int_c \int_p -\log(\hat{q}_c(p))f(c, p)dp\,dc \qquad (7)$$

$$= \int_c \int_p -\log(\hat{q}_c(p))f(c \mid p)f(p)dp\,dc \qquad (8)$$

$$= \int_p f(p) \sum_i [Pr(c = i \mid p)[-\log(\hat{q}_i(p))]]dp \qquad (9)$$

$$= \int_p f(p)q^T(p)[-\log(\hat{q}(p))]dp \qquad (10)$$

$$= E_{f(p)}[H_x(q(p), \hat{q}(p))] \qquad (11)$$

$$= E_{f(p)}[H(q(p))] + E_{f(p)}[D_{KL}(q(p)\|\hat{q}(p))] \qquad (12)$$

Equation 12 shows that the cost is equal to the expected entropy of the optimal estimator plus the expectation of the Kullback-Leibler divergence of our estimator with respect to the optimal estimator. This follows from Equation 11 because cross entropy can always be expressed as: entropy plus KL-divergence. Entropy and KL-divergence are both non-negative quantities, and KL-divergence takes a minimum value of zero when the two probability vectors are equal. The first term in Equation 12 is non-negative, and independent of our estimator—this term is the lower bound of the cost. The second term is also non-negative, and takes the value of zero when the estimator is equal to the optimal estimator. Therefore, the cost is minimized by the optimal estimator.

Equation 6 is interpreted as the expected surprisal of the true class, given the estimated probability vector. The surprisal of an event is defined as the negative logarithm of the probability of the event. Therefore, an occurrence of an event that is thought to have a low probability would have a high surprisal. Intuitively, it can indeed be thought of as how surprised one would be to observe an event. So, the preferred estimator provides class probabilities such that on average, if we were to observe the true class afterwards, we would be the least surprised.

The information-theoretic cost provides the best criteria to optimize our estimator, but it is also useful to use a simpler cost. The other cost is a least squares cost, which produces a relatively quick initial solution in closed form.

Figure 3:
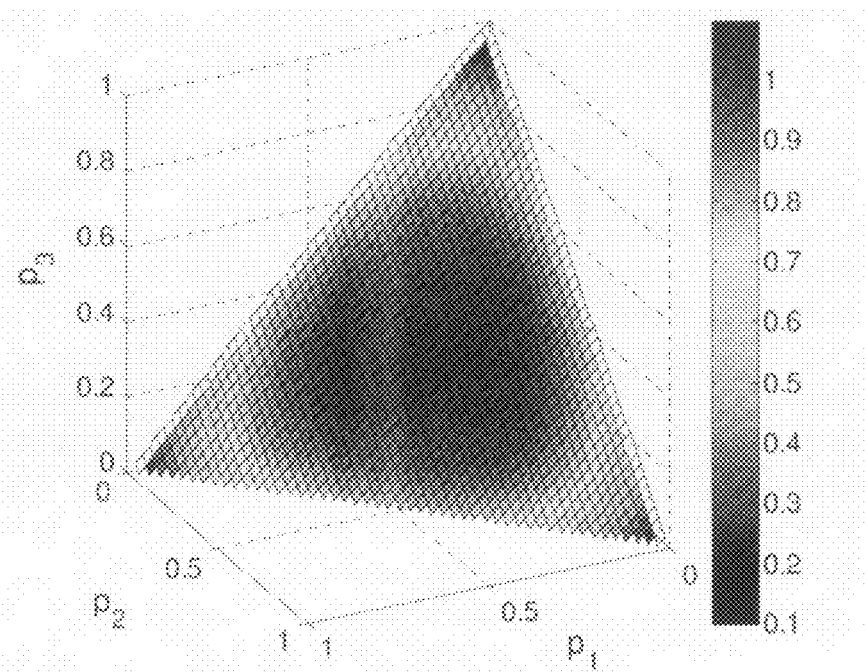
FIG. 3 is a plot of entropy over the simplex in three-dimensional probability space.
Figure 4:
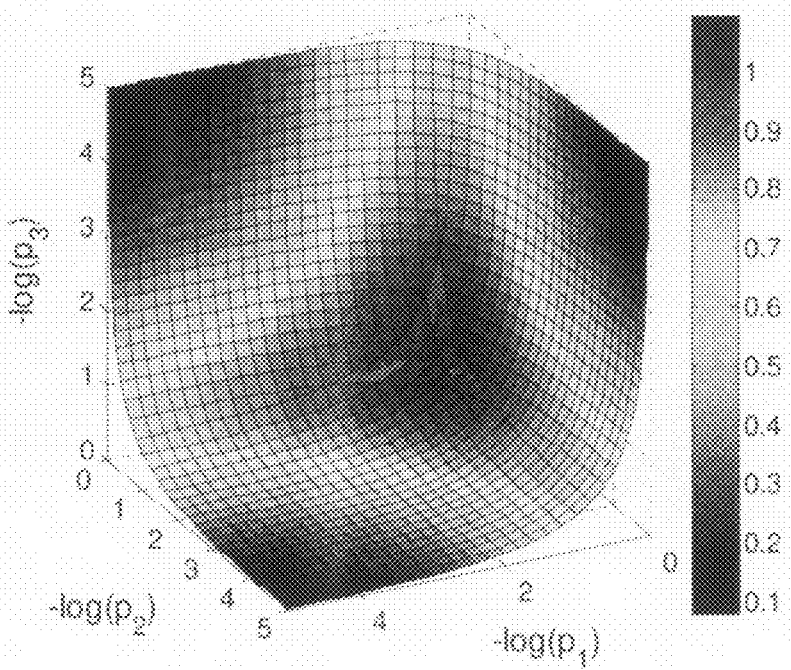
FIG. 4 is a plot of entropy over the simplex in log-space in accordance with the subject invention.

The set of all possible n-dimensional probability vectors forms a simplex in n-dimensional probability space. The simplex is the region of points whose elements are non-negative and sum to one. The mapped probability vector should also satisfy these constraints which can be done by either solving a constrained optimization problem, or by projecting the mapped result ($\hat{q}$) onto the simplex. The latter method is preferred because solving a constrained problem is more difficult, and the average performance tends to suffer as a result of the constraints. If all elements of $\hat{\tilde{q}}$ are non-negative, then normalizing it (dividing by its sum) will project the point onto the simplex. If there are negative elements, then there is no satisfactory way to project onto the simplex. Mapping in log-space eliminates this problem. For convenience, define the transforms that go from probability space (FIG. 3) to log-space (FIG. 4) and vice versa:

$$S(x) \equiv -\log(x), \text{ and} \qquad (13)$$

$$S^{-1}(x) = \exp(x). \qquad (14)$$

The lowercase s with a subscript denotes a variable that is in log-space. So, $$s_p = S(p), \text{ and} \qquad (15)$$

$$p = S^{-1}(s_p) \qquad (16)$$

The tilde (~) signifies that a probability vector hasn't been normalized, i.e. doesn't lie on the simplex. The general form of the mapping function, and the post-mapping normalization are described as:

$$\hat{\tilde{s}}_q = \text{map}(s_p), \qquad (17)$$

and $$\hat{q} = \frac{1}{\Sigma \hat{\tilde{q}}} \hat{\tilde{q}}. \qquad (18)$$

The log function transforms the interval $(0,\infty)$ to $(-\infty,\infty)$, so there are no longer "bad" regions to avoid. The mapping is now optimized with no constraints because any mapped point can be projected onto the simplex. Another reason for mapping in log-space is that distance is more intuitive in log-space. It captures the notion that for probabilities, the difference between 0 and 0.1 is more significant than the difference between 0.6 and 0.7.

We can define a least squares cost function that is the expected value of the distance in log-space between our estimate $\hat{q}(p)$ and the (super-optimal) feature-fusion estimate $q(y)$. It is unfair to compare our estimate to the feature-fusion estimate, because in general, the p vector contains less discrimination information than the features. However, since the optimal estimator $q(p)$ is not known, $q(y)$ is used in its place.

In the least squares cost, there is something to be considered about normalization and distance. Normalization in log-space is done by projecting a point along the direction of the ones vector $\mathbf{1} = [1\ 1\ \ldots\ 1]^T$ onto the "log-simplex". In three dimensions, the "log-simplex" is shaped somewhat like a cobweb in the corner of a room. Unlike the simplex, it is unbounded, and it stretches to infinity, asymptotically approaching the "walls" of the "room". Since the points are normalized after mapping, any two mapped points that differ only by some scalar times the ones vector will result in the same probability vector. Therefore, it is beneficial to disassociate distance along the ones vector from the cost. The resulting least squares cost is:

$$\Psi_{LS}(\hat{q}(\cdot)) \equiv E_{f(y)}[\Delta s^T A^T A \Delta s], \text{ and} \quad (19)$$

$$= E_{f(y)}[\Delta s^T A \Delta s], \quad (20)$$

$$\text{where } \Delta s = S(\hat{\bar{q}}(p)) - S(q(y)). \quad (21)$$

The nomenclature of the above equations is described in the following table:

| | |
|---|---|
| y | The vector of features. |
| p | The probability vector from a sensor. These classes are the sensor classes. For the case where there is more than one sensor, p is a larger, stacked vector of the sensors' probability vectors. This is a function of the features y, which were measured by the sensors. |
| q(y) | The ideal feature classifier. This operates on the features, and returns a probability vector of the base classes. |
| $\hat{\bar{q}}(p)$ | The un-normalized mapping function. This operates on the sensors' probability vectors, and returns the un-normalized estimated probability vector of the base classes. |
| S(·) | The conversion from probability space to log-space, defined by: S(p) = –log(p) |
| $\Psi_{LS}(\hat{q}(\cdot))$ | The least-squares cost of the selected $\hat{q}(\cdot)$ function. The argument is omitted because the cost is averaged over all p, and therefore the cost is not a function of p. |
| f(·) | A continuous probability density function. (A discrete pdf can be expressed as a continuous pdf by using delta functions.) |
| $E_{f(\cdot)}[\cdot]$ | The expected value of [·] over f(·). |

The matrix $A=I-(1/n)11^T$ is a projection onto the zero-sum plane. A is symmetric and idempotent, so $A^T A=A$. Remember that we know the deterministic function p(y). $\hat{q}(p)$ is parameterized in a way that allows a solution for the parameters using least squares.

Figure 5:
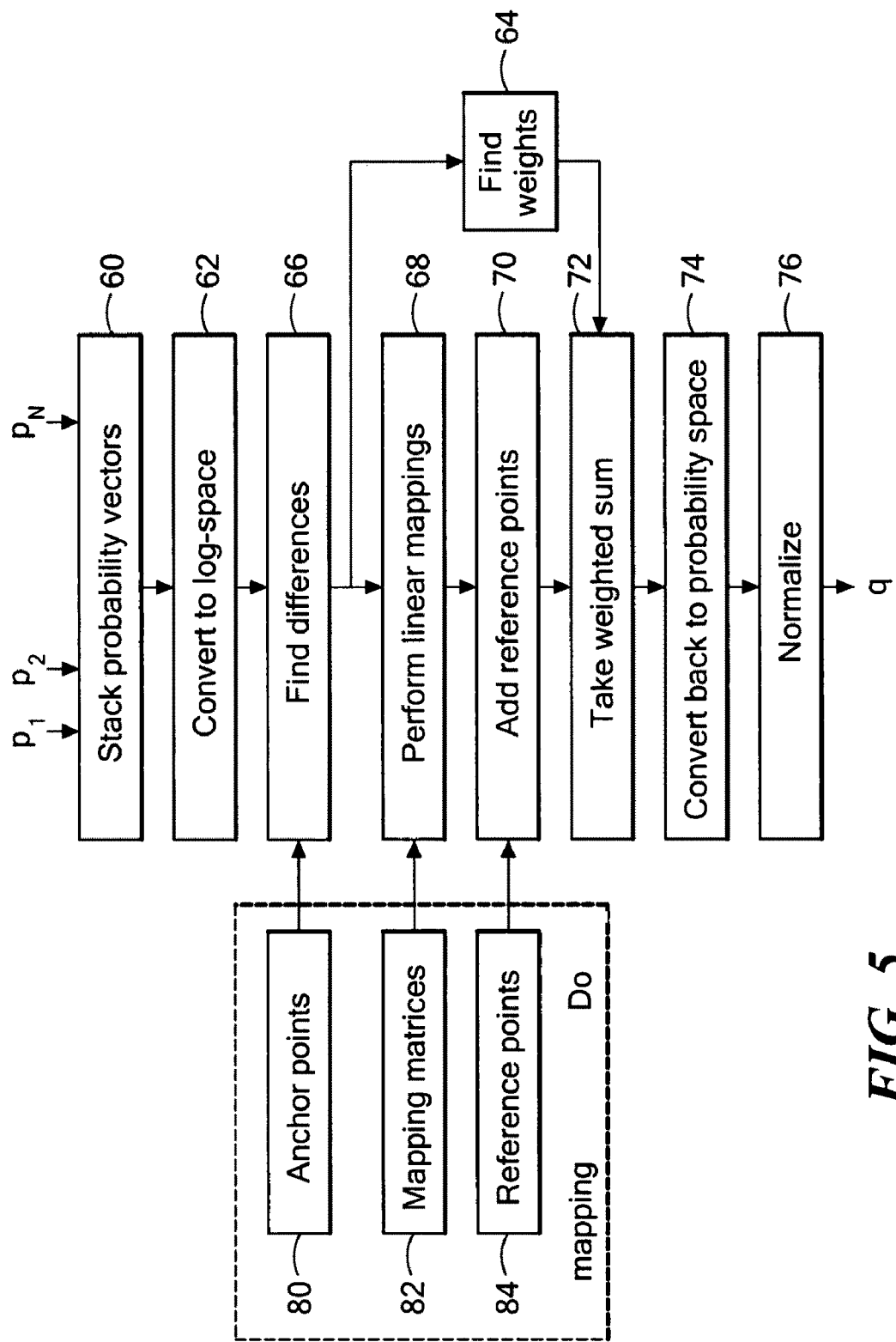
FIG. 5 is a flow chart depicting the primary steps associated with the programming of the fusion node of FIG. 2.

The function for estimating base class probabilities $\hat{q}(p)$ is a nonlinear mixing of jointly optimized linear mappings in log-space. One element of the function is the use of "anchor points" to localize mappings to different regions of probability space. The localization involves a nonlinear function that weights the multiple linear mappings. The estimator function carried out by fusion node 50, FIG. 2, and as shown in FIG. 5, typically has nine steps:

In step 60, the probability vectors are stacked. If two or more sensors report probability vectors, they are made into one large vector by stacking them:

$$p = \begin{bmatrix} p_1 \\ p_2 \\ \vdots \\ p_n \end{bmatrix} \quad (22)$$

This stack is then converted to log-space, step 62. Conversion to log-space occurs by taking the negative natural logarithm of each element:

$$s_p = -\log(p) \quad (23)$$

In step 66, the $i^{th}$ difference (where $i=1:n_a$) is computed by subtracting the corresponding anchor point $\bar{s}_{pi}$ from $s_p$. The $i^{th}$ difference is:

$$\Delta s_{pi} = s_p - \bar{s}_{pi} \quad (24)$$

The weights are computed, step 64 by first finding the squared distance of the input $s_p$ from each of the anchor points $\{\bar{s}_{pi}\}$. Then, to compute the $i^{th}$ weight the product is taken of the squared distances to each anchor point except the $i^{th}$. The equations for the vector of weights are:

$$\tilde{w}_i = \prod_{j \neq i} (s_p - \bar{s}_{pj})^T (s_p - \bar{s}_{pj}), \quad (25)$$

and

-continued $$w = \frac{\tilde{w}}{\sum \tilde{w}}. \quad (26)$$

Each difference $\Delta s_{pi}$ is mapped, step 68 by performing a matrix multiply with the corresponding mapping matrix $M_i$, to get the mapped differences:

$$\Delta s_{qi} = M_i \Delta s_{pi} \quad (27)$$

In step 70, the result of the $i^{th}$ mapping is computed by adding the $i^{th}$ reference point $\bar{s}_{qi}$ to the $i^{th}$ mapped difference:

$$\hat{\bar{s}}_{qi} = \bar{s}_{qi} + \Delta s_{qi} \quad (28)$$

In step 72, the results of the individual mappings are combined by taking a weighted sum:

$$\hat{\bar{s}}_q = \sum_{i=1}^{n} w_i \hat{\bar{s}}_{qi} \quad (29)$$

In step 74, a transformation from log-space back to probabilities is performed by raising the natural base to the negative of each element of the combined mapping results:

$$\tilde{q} = \exp(-\hat{\bar{s}}_q) \quad (30)$$

Normalize the resulting probability vector, step 76, includes dividing each element by the sum of the elements:

$$q = \frac{\tilde{q}}{\Sigma \tilde{q}} \quad (31)$$

The preconfigured data involved in the mapping function includes anchor points 80, mapping matrices 82, and reference points 84. The mapping matrices and reference points are a result of the optimization. How to determine the anchor points will be described later.

All mappings are solved simultaneously, and it helps to define the mapping in a form that can be written in a single matrix equation:

$$N = [M_1 \, M_2 \ldots M_{nw} \, \bar{s}_{q1} \, \bar{s}_{q2} \ldots \bar{s}_{qnw}], \quad (32)$$

$$u = [w_1(s_p - \bar{s}_{p1})^T w_2(s_p - \bar{s}_{p1})^T \ldots w_{nw}(s_p - \bar{s}_{p1})^T \, w^T]^T, \text{ and} \quad (33)$$

$$\hat{\bar{s}}_q = Nu. \quad (34)$$

Here, $n_w$ is the length of the weight vector (and the number of anchor points). The matrix N specifies the mapping matrices 82 and the reference points 84. The normalized mapped result in log-space is:

$$\hat{s}_q = \hat{\bar{s}}_q + 1\log(1^T e^{-\hat{\bar{s}}_q}) \quad (35)$$

$$= Nu + 1\log(1^T e^{-Nu}). \quad (36)$$

The mapping matrix N is optimized according to the information theoretic cost. This cost is a nonlinear function which might have multiple local minima, so numerical optimization is used. In the optimization, better results are obtained if there is a good initial guess. For the initial guess, a mapping that minimizes the least squares cost function is preferred.

Figure 12:
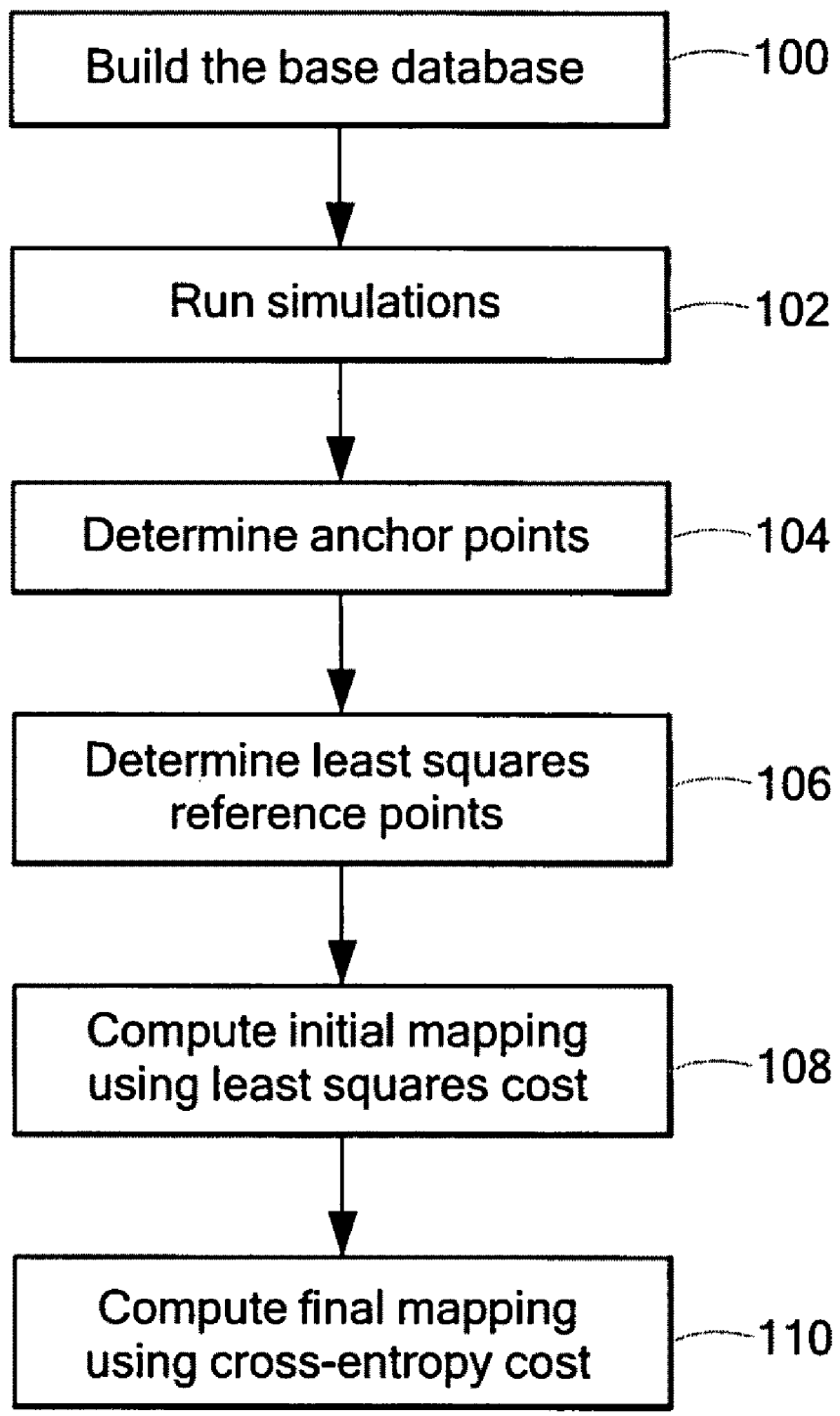
FIG. 12 is a flow chart describing how mapping may be accomplished in accordance with the subject invention.

The process of determining the mappings is described in FIG. 12. It typically includes six steps: build the base database $D_0$, step 100, run simulations, step 102, determine anchor points, step 104, determine least squares reference points, step 106, compute initial mapping, step 108, and compute final mapping, step 110.

As known in the art, step 100 involves choosing scenarios, threat types, and trajectories, and populating the database with them. The database should encompass all the variations that are expected to be encountered, such as object shapes, materials, deployment times, and trajectory types. Classes are defined, such as: RV, tank, decoy, debris, etc. Each object in the database is marked with its true class. For instance, one trajectory in the database may have 10 objects, consisting of 1 RV, 1 tank, 3 decoys, and 5 debris.

In step 102, radar simulations are run on all trajectories and objects (or a representative set) from the database, which simulate the radars measuring features of the objects, and classifying them using the sensor databases. Each sensor classifies the objects it measures, according to its own database, which may or may not match the base database. The result of this step is a set of training points. Each training point describes one object, and contains the object's true base class, the probability vector that came from each sensor, and the feature vector that each sensor used.

In step 104, the use of multiple anchor points (mappings) amounts to something similar to what is known as the "kernel trick". The kernel trick is a way to make a nonlinear estimator without having to solve nonlinear equations. It is done by first nonlinearly transforming the input data into a higher dimensional space, and then solving for a linear estimator that operates on the transformed input data.

The anchor points are found by running each sensor's classifier (using that sensor's database) on the feature vector that comes from the mean of each base class distribution, stacking them, and then converting to log-space.

$$p(\bar{y}_i) = \begin{bmatrix} p_1(\bar{y}_i) \\ p_2(\bar{y}_i) \\ \vdots \\ p_{ns}(\bar{y}_i) \end{bmatrix} \quad (37)$$

$$\bar{s}_{pi} = -\log(p(\bar{y}_i)) \quad (38)$$

At step 106, a least squares reference point will be computed for each training point. These will be used to define the least squares cost function when computing the initial mapping. The least squares reference points are found by running the optimal classifier with the base database on the feature vector contained in the training point, and then converting to log-space.

$$\bar{s}_{q^*} = \log(q(y)) \quad (39)$$

The least squares cost for a single point can be written in terms of the parameter matrix N as follows:

$$\Psi_{LS}(N) = E_{f(y)}[\Delta s^T A^T A \Delta s] \quad (40)$$

$$= E_{f(y)}\left[\left(\hat{\bar{s}}_q - s_{q^*}\right)^T A\left(\hat{\bar{s}}_q - s_{q^*}\right)\right] \quad (41)$$

$$= E_{f(y)}\left[\hat{\bar{s}}_q^T A \hat{\bar{s}}_q - 2 s_{q^*}^T A \hat{\bar{s}}_q + s_{q^*}^T A s_{q^*}\right] \quad (42)$$

$$= E_{f(y)}[u^T N^T A N u - 2 s_{q^*}^T A N u + s_{q^*}^T A s_{q^*}] \quad (43)$$

where:

| | |
|---|---|
| $\Psi_{LS}(N)$ | The single point least-squares cost of the $\hat{q}(\cdot)$ function determined by N. |
| N | The matrix containing all mappings and reference points, described in equation 31. |
| $\Delta s$ | The difference between the mapped result in log-space (pre-normalization) and the corresponding least squares reference point. |
| $s_{q^*}$ | The least squares reference point. Each training point has one of these associated with it. |
| $\hat{\bar{s}}_q$ | The mapped result in log-space before normalization. |
| A | The matrix that projects a vector of length $n_q$ (the number of base classes) onto the zero-sum plane. $A = I - (1/n_q)11^T$ |
| $E_{f(y)}[\cdot]$ | The expected value of $[\cdot]$ over f(y). |
| f(y) | The pdf of the feature vector. |
| u | The input vector of weighed differences and weights, as described in equation 32. |

The partial derivatives of the least squares cost are:

$$\frac{\partial \Psi_{LS}}{\partial N} = E_{f(y)}\left[\frac{\partial}{\partial N} u^T N^T A N u\right] - 2 E_{f(y)}\left[\frac{\partial}{\partial N} s_{q^*}^T A N u\right] \quad (44)$$

$$\frac{\partial}{\partial N} u^T N^T A N u = 2 A N u u^T \quad (45)$$

$$\frac{\partial}{\partial N} s_{q^*}^T A N u = A s_{q^*} u^T \quad (46)$$

Setting the partial derivatives to zero gives us an equation that will define N:

$$\frac{\partial \Psi_{LS}}{\partial N} = 0 \Rightarrow ANE_{f(y)}[uu^T] = AE_{f(y)}[s_{q^*}u^T] \quad (47)$$

There is generally more than one solution, for a few reasons: A is not full rank and a feature that is critical to discriminating between two classes may not have been measured. A more general version of the second reason is the placement of the sensor classes could be such that the p vector doesn't help to discriminate between some base classes.

At step 108, by using the pseudo-inverse, we can solve for the minimum-norm solution:

$$N = pinv(A)AE_{f(y)}[s_{q^*}u^T]pinv(E_{f(y)}[uu^T]) \quad (48)$$

The expected values are taken using Monte Carlo integration over the set of training points. Then N is computed via the previous equation. N defines the mappings and reference points. This is the initial mapping solution.

In the least squares cost, we were able to separate the mapping and normalization steps, which allowed us to optimize a linear function of N. The information based cost function is not a linear function of N because it requires the estimate of the vector q to be normalized before evaluating the cost. The normalization involves division by a function of N, which makes things nonlinear. We use numerical optimization to try to minimize the cost function.

At step 110, the "fminunc" function from MATLAB's optimization toolbox is used to minimize the cost function. Functions are provided to the fminunc function, which compute the cost and its gradient and Hessian. By taking the averages of the single point cost, gradient, and Hessian over the training points, the total cost and its derivatives are computed. Having analytic expressions for the partial derivatives (as opposed to using finite differencing), leads to faster optimization and better results. The equations for the single point cost, gradient, and Hessian are as follows:

$$\text{Cost: } \psi = a_c^T[-\log(\hat{q})] \quad (49)$$

$$\text{Gradient: } \frac{\partial \psi}{\partial N} = (a_c - (1^T a_c)\hat{q})u^T \quad (50)$$

$$\text{Gradient (vectorized): } \frac{\partial \psi}{\partial N(:)} = u \otimes (a_c - (1^T a_c)\hat{q}) \quad (51)$$

$$\text{Hessian: } \frac{\partial^2 \psi}{\partial N(:)\partial N(:)} = (uu^T) \otimes (\text{diag}((1^T a_c)\hat{q}) - (1^T a_c)\hat{q}\hat{q}^T) \quad (52)$$

where:

| | |
|---|---|
| $\psi$ | The single point cost of the $\hat{q}(\cdot)$ function. |
| $\hat{q}$ | The value of the $\hat{q}(\cdot)$ function at one training point. This is the normalized probability vector of base classes. |
| $a_c$ | The $c^{th}$ column of the identity matrix. Alternatively, it could be defined as the $c^{th}$ column of some arbitrary matrix, whose elements can be chosen to represent costs of various types of misclassification. |
| N | The matrix containing all mappings and reference points, described in equation 31. |
| u | The input vector of weighed differences and weights, as described in equation 32. |
| N(:) | The vectorized parameter matrix. It is formed by stacking the columns of N, in order. The (:) notation is borrowed from MATLAB. |
| $\frac{\partial \psi}{\partial N}$ | The partial derivatives of the single point cost with respect to the parameter matrix N. This is a matrix that is the same size as N. |
| $\frac{\partial \psi}{\partial N(:)}$ | The partial derivatives of the single point cost with respect to the vectorzied N. This is the same size as vectorized N. |
| $\frac{\partial^2 \psi}{\partial N(:)\partial N(:)}$ | The Hessian ($2^{nd}$ partial derivatives) of the single point cost function with respect to vectorzied N. |
| $\otimes$ | The Kronecker product operator. |
| diag($\cdot$) | The function which forms a diagonal matrix from a vector (as implemented in MATLAB). |

The following three examples show the performance of this system. The results are based on simulated data. We used Gaussian classes in the base and sensor databases. To evaluate the performance of the algorithm of FIG. 5, the surprisals for 200 sample points were plotted and the mean calculated, which is the cost. As the number of points approaches infinity, the mean surprisal approaches the expected cross entropy between the optimal estimator and our estimator. The surprisals are normalized, meaning that the logarithms are taken with the base equal to the number of base classes. The sample points are random draws from the joint distribution of class and measurements, and are drawn separately from the training points.

When using normalized surprisals, a uniform distribution always results in a surprisal of 1. While it is possible for the cost to be any positive number, 1 is the upper bound on the cost for a useful algorithm. One can always meet the performance of this bound by admitting total ignorance (a uniform distribution). If the cost is greater than 1, then we could do better by just ignoring the data, and declaring a uniform distribution. We also have a lower bound, which we get by evaluating the performance of feature fusion. Feature fusion is optimal, but it uses the features, so in general it has more information than our algorithm. As a result, the cost from feature fusion is a lower bound that, depending on the scenario, may not be possible to reach.

Example 1

The first example is designed to show how much we can improve performance, relative to probability fusion. The setup is as follows: 2 features, 2 base classes, and 2 sensors wherein sensor 1 measures feature 1, and sensor 2 measures feature 2. There is no database mismatch and the sensors have the correct marginals. 10,000 training points were used. See FIG. 6.

As shown in FIG. 7A-7C the two base classes have equal covariances, but their means differ in both dimensions. The covariances are oriented at 45°, and have aspect ratios of 10:1, so the two features are very correlated. Because of the large correlation, and relatively small difference in the means, both sets of marginals have a lot of overlap. Because of the overlap, the results from simple probability fusion are very conservative, meaning that the estimated class probabilities are nearly uniformly distributed. If we had the features, we would get much better performance, because having both features makes it easier to see the separation of the classes. In this case however, it is possible to recover the features, because the probability vectors from the sensors are monotonic functions, which makes them invertible. Our algorithm, while not explicitly inverting to get the measurements, does essentially just as well as feature fusion in this case. If we were to increase the number of training points, the performance would be even closer to that of feature fusion.

Example 2

Figure 8:
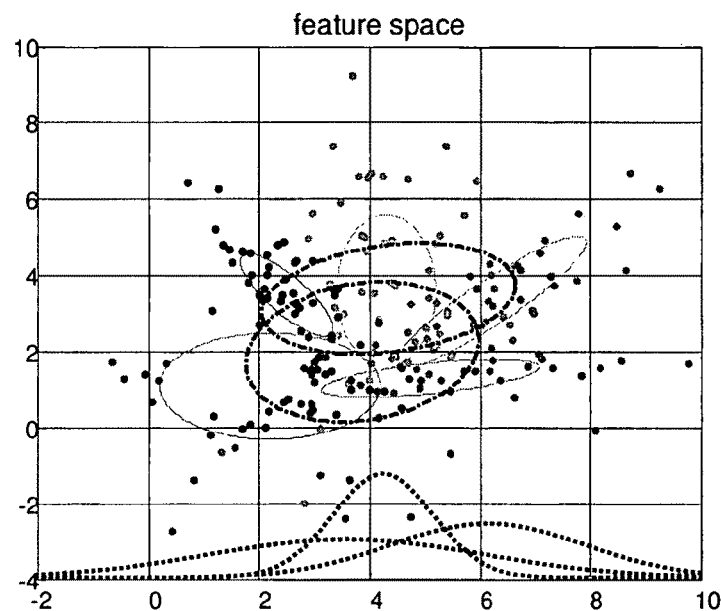
FIG. 8 is a graph showing the base and sensor class distributions for a second example of the implementation of the method of the subject invention.

The second example is designed to show a more complicated case, with multiple sensors and database mismatch. The setup is as follows: 2 features, 5 base classes, and 2 sensors wherein sensor 1 measures feature 1, sensor 2 measures feature 1 and feature 2. The sensors have badly mismatched distributions. 10,000 training points were used. See FIG. 8.

Figure 9A:
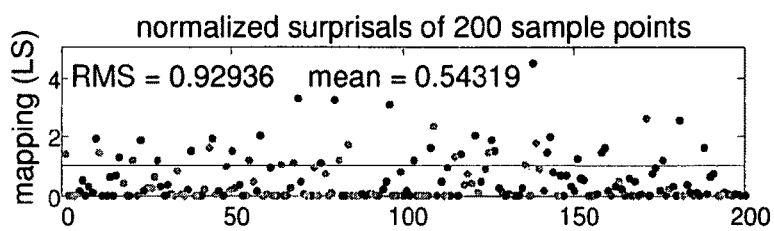
FIGS. 9A-9C are graphs showing the normalized surprisals of 200 sample points for the second example referred to with respect to FIG. 8 for mapping (LS), mapping, and feature fusion, respectively.
Figure 9B:
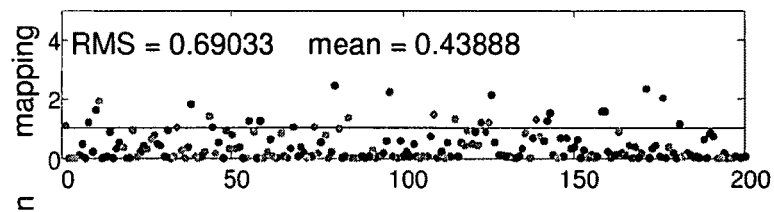
Figure 9C:
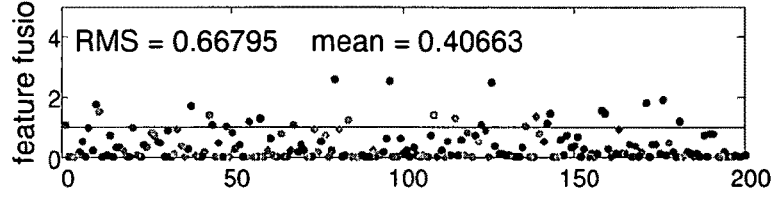

As shown in FIGS. 9A-9C, the five base class distributions vary in spread and correlation. Sensor 1 measures feature 1, and has three classes. Sensor 2 measures both features, but has only two highly overlapping classes. There would be no clear way to do simple probability fusion. So, instead of using the probability fusion results for comparison, we'll use the results from the mapping derived from the least squares cost. In this case, mapping performs far better than declaring uniform probabilities (ignorance), substantially better than the least squares cost mapping, and very close to feature fusion. This shows that we can fuse probability vectors from multiple sensors in the presence of database mismatch, and recover most of the performance, relative to feature fusion.

Example 3

Figure 10:
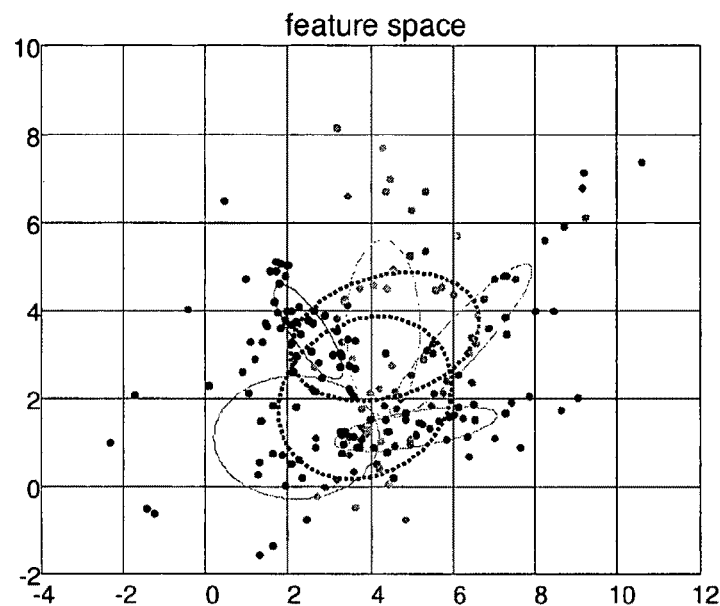
FIG. 10 is a graph showing the base and sensor class distributions for a third example of the implementation of the method of the subject invention.

The third example is the same as the second case, except that now we only have sensor 2. The setup is as follows: 2 features, 5 base classes, and 1 sensor (measures both features). The sensor has badly mismatched distributions. 10,000 training points were used. See FIG. 10.

Figure 11A:
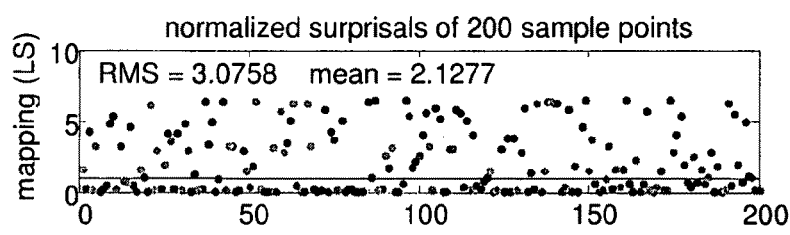
FIGS. 11A-11C are plots of the normalized surprisals of 200 sample points for the third example of FIG. 10 showing mapping (LS), mapping, and feature fusion, respectively.
Figure 11B:
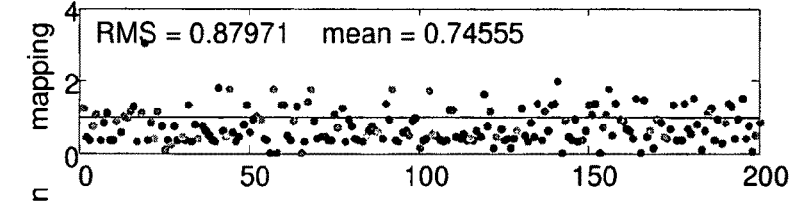
Figure 11C:
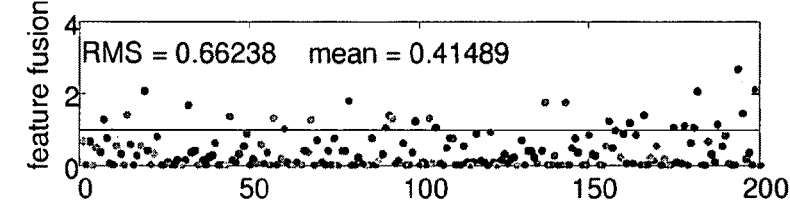

As shown in FIGS. 11A-11C, the sensor measures both features, and has the same distributions as sensor 2 in the previous example. This example is designed to test the algorithm when there is a lot of missing information. It is obvious that it is impossible to do as well as feature fusion, because the two sensor classes, will not give much insight into feature 1, since they only differ significantly along feature 2. A good algorithm will admit uncertainty when there is insufficient information. The worst thing you can do is to be overconfident, favoring some classes too strongly, while ruling out other classes. Overconfidence is much worse than ignorance. Overconfidence leads to performance that is worse than if you were to ignore the data and declare uniform probabilities. An overconfident estimator causes leakage—the declaration of a lethal target as non-lethal. Our estimator is able to avoid overconfidence while discriminating aggressively, as this case shows. The results are substantially better than declaring ignorance. We don't do as well as feature fusion, but it is obvious that that is impossible in this example.

The result is a feasible and useful method of and system for estimating conditional class probabilities from arbitrary data, which performs well in the presence of missing information. It is able to discriminate aggressively without being overconfident. It has the desirable quality of seeking the optimal or true conditional class probabilities without assuming a decision rule for how the probabilities will be used. This is ideal for operating within a distributed control, multi-sensor network. The method we've developed provides a good discrimination/fusion solution for the existing data interface problem.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments. Other embodiments will occur to those skilled in the art and are within the following claims.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

What is claimed is:

1. A method of fusing the outputs of multiple sensors, the method comprising:
   inputting to a fusion engine the output of each sensor including a sensor class probability vector based on each sensor's classification database; and
   estimating, using a microprocessor, a base class probability vector based on the sensor class probabilities output by the sensors and a mapping function.

2. The method of claim 1 in which estimating includes converting the sensor class probability vector to log-space.

3. The method of claim 2 in which the mapping function includes anchor points and estimating includes finding the differences between the log-space probability vectors and the anchor points.

4. The method of claim 3 in which the mapping function includes mapping matrices and estimating includes mapping each difference using the mapping matrices.

5. The method of claim 4 in which the mapping function includes reference points and estimating includes adding reference points to the mapped differences.

6. The method of claim 5 in which estimating includes weighting and summing the mapped differences.

7. The method of claim 6 in which estimating includes converting the weighted and summed mapped differences back to probability space to produce the probability vector.

8. The method of claim 7 in which the estimating includes normalizing the probability vector.

9. A system for fusing the output of multiple sensors, the system comprising:
   multiple sensors each including a classification database and each outputting a sensor class probability vector based on its classification database;
   a fusion engine responsive to the output of each sensor; and
   a mapping function;
   the fusion engine configured to estimate a base class probability vector based on the sensor outputs and the base database classes.

10. The system of claim 9 in which the fusion engine is configured to convert the sensor class probability vectors to log-space.

11. The system of claim 10 in which the mapping function includes anchor points and the fusion engine is configured to find the differences between the log-space probability vectors and the anchor points.

12. The system of claim 11 in which the mapping function includes mapping matrices and the fusion engine is configured to map each difference using the mapping matrices.

13. The system of claim 12 in which the mapping function includes reference points and the fusion engine is configured to add reference points to the mapped differences.

14. The system of claim 13 in which the fusion engine is configured to weight and sum the mapped differences.

15. The system of claim 14 in which the fusion engine is configured to convert the weighted and summed mapped differences back to probability space to produce the probability vector.

16. The system of claim 15 in which the fusion engine is configured to normalize the probability vector.

* * * * *